US010036593B2

(12) United States Patent
Ohm

(10) Patent No.: US 10,036,593 B2
(45) Date of Patent: Jul. 31, 2018

(54) APPARATUS FOR DRYING AND CONCENTRATION USING WASTE VAPOR

(71) Applicant: Hanbat National University Industry-Academic Cooperation Foundation, Daejeon (KR)

(72) Inventor: Tae In Ohm, Daejeon (KR)

(73) Assignee: Hanbat National University Industry-Academic Cooperation Foundation, Daejeon (KR)

( * ) Notice: Subject to any disclaimer, the term of this patent is extended or adjusted under 35 U.S.C. 154(b) by 579 days.

(21) Appl. No.: 14/287,199

(22) Filed: May 27, 2014

(65) Prior Publication Data

US 2015/0128440 A1 May 14, 2015

(30) Foreign Application Priority Data

Nov. 13, 2013 (KR) .................. 10-2013-0137602

(51) Int. Cl.
*F26B 3/00* (2006.01)
*F26B 23/00* (2006.01)

(52) U.S. Cl.
CPC .......... *F26B 23/002* (2013.01); *Y02P 70/405* (2015.11)

(58) Field of Classification Search
CPC .. F26B 23/002; F26B 23/0002; F26B 23/001; F26B 23/004; F26B 23/005; F26B 23/007; F26B 23/008
USPC ..... 34/514, 169, 513, 467, 72, 86, 413, 398, 34/397, 515
See application file for complete search history.

(56) References Cited

U.S. PATENT DOCUMENTS

| 4,072,273 A * | 2/1978 | Reiniger ................. B02C 13/14 |
| | | 241/19 |
| 4,224,286 A * | 9/1980 | Murase .................... B01J 21/20 |
| | | 34/168 |
| 4,581,829 A * | 4/1986 | Becker .................. F26B 23/004 |
| | | 34/402 |

(Continued)

FOREIGN PATENT DOCUMENTS

| KR | 10-2011-0024398 A | 3/2011 |
| KR | 10-1176368 B1 | 8/2012 |

(Continued)

*Primary Examiner* — Kenneth Rinehart
*Assistant Examiner* — John McCormack
(74) *Attorney, Agent, or Firm* — Revolution IP, PLLC

(57) ABSTRACT

Disclosed is an apparatus for drying and concentrating, using waste vapor, which includes: a vapor supplying unit that produces and supplies vapor, using a boiler; a vapor storing unit that temporarily stores the vapor from the vapor supplying unit; a drying/concentrating unit that receives the vapor from the vapor storing unit and dries/concentrates a high-moisture material, in an indirect heat transfer type; a waste vapor collecting unit that collects waste vapor produced from the high-moisture material in the drying/concentrating unit; a vapor compressing unit that compresses the waste vapor collected by the waste vapor collecting unit; a condensate water discharging unit that separates condensate water, which is discharged after used as heat source in the drying/concentrating unit, and stink gases and discharges them; and a stink gas supplying line through which the stink gases separated by the condensate water discharging unit is supplied to the boiler.

6 Claims, 1 Drawing Sheet

(56) References Cited

U.S. PATENT DOCUMENTS

| | | | |
|---|---|---|---|
| 5,343,632 A | 9/1994 | Dinh | |
| 5,372,007 A * | 12/1994 | Garbo | F01K 21/04 60/649 |
| 5,548,906 A | 8/1996 | Lee et al. | |
| 5,636,449 A * | 6/1997 | Gaddis | F26B 11/0445 34/124 |
| 2008/0271335 A1 * | 11/2008 | Kimball | F23G 5/0273 34/79 |
| 2013/0125412 A1 * | 5/2013 | Haarlemmer | C02F 11/12 34/477 |

FOREIGN PATENT DOCUMENTS

| | | | |
|---|---|---|---|
| KR | 101176368 B1 * | 8/2012 | |
| KR | 10-2012-0097804 A | 10/2013 | |

* cited by examiner

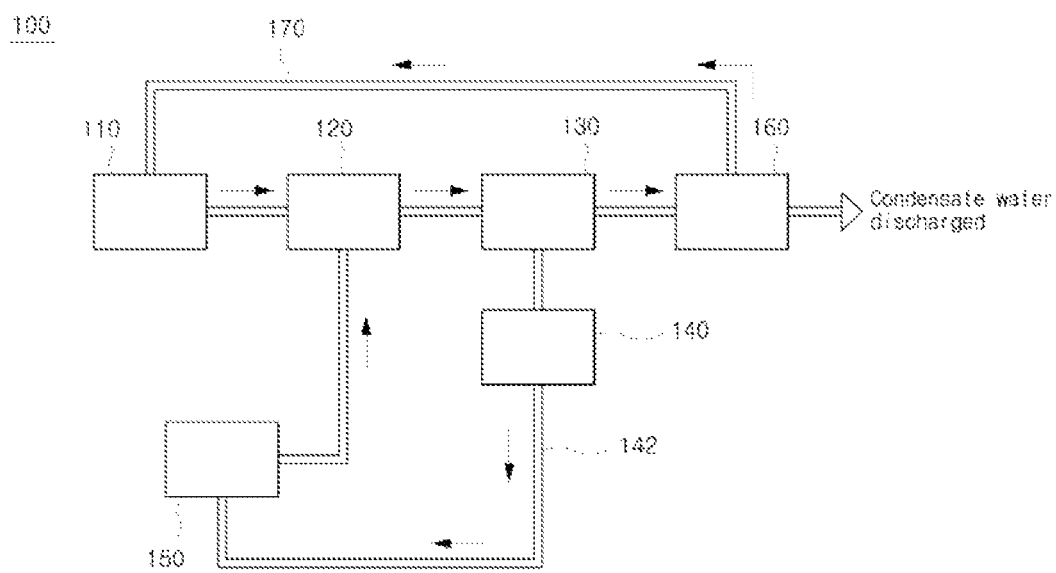

ID OF THE DRYING AND
CONCENTRATION USING WASTE VAPOR

CROSS-REFERENCE TO RELATED APPLICATIONS

This application claims the priority of Korean Patent Application No. 10-2013-0137602 filed on Nov. 13, 2013 in the Korean Intellectual Property Office, the disclosure of which is incorporated herein by reference.

BACKGROUND OF THE INVENTION

Field of the Invention

The present invention relates to an apparatus for drying and concentrating which waste vapor, and more particularly to an apparatus for drying and concentrating, using waste vapor which can recycle waste vapor from high-moisture materials therein, discharge odious gases that may be generated in a portion of drying and concentrating, and remove the odious gases, by sending the stink gas with the waste vapor into a waste vapor compression unit, compressing them at high temperature and high pressure with a compressor equipped with an impeller rotating at over 30,000 RPM, by consuming the heat energy of the compressed waste vapor as the heat source in drying and concentrating, by separating the odious gases while the waste vapor condenses, and by burning it with fuel in a boiler of a vapor supplying unit.

Description of the Related Art

Drying and concentrating are performed in various types, using vapor in processing of food, producing of medicines, and manufacturing of semiconductors, but there is a problem in that the vapor is high-temperature and high-pressure vapor, there is a lot of energy for producing the vapor, and a lot of odious gases are generated in some of the processes.

Further, high-moisture wastes containing a large amount of water is produced in the type of sludge in the process of processing sewage and waste water. It is required to effectively process the wastes, because they are an important one of the factors contaminating water and soil.

In the related art, a typical method of processing high-moisture wastes is to dry them by bring them in contact a high-temperature gas and burn the odious gases produced in the drying.

However, there is a problem in that a lot of energy is consumed to produce the high-temperature gas for drying the wastes and burn the odious gases. Further, there is another problem in that the odious gases cannot be burned, when the device for producing the high-temperature gas and the burner for removing the odious gases are stopped due to a reason such as a power failure.

In order to solve the problem, there is Korean Patent Publication No. 2012-0097804. According to the patent, vapor is produced by a specific boiler, sludge is heated and dried by the vapor, and the odious gases produced in the drying is burned in the boiler.

However, the patent has a problem in that a lot of energy is consumed because drying/condensing is performed only by the vapor produced by the boiler. Further, the waste vapor produced in heating and drying of sludge has a predetermined amount of heat, but the heat is dissipated to the air and not restored, so the energy is wasted.

SUMMARY OF THE INVENTION

The present invention has been made in an effort to provide an apparatus for drying and condensing using waste vapor which can save energy by collecting and compressing waste vapor, which is produced from high-moisture materials in drying and condensing, and then reusing heat energy in the drying and condensing.

Further, the present invention provides an apparatus for drying and condensing using waste vapor which can remove odious gases through burning by separating a stink gas discharged after used as a thermal energy source in drying and condensing from condensate water and then supplying it to a boiler that produces vapor.

According to the present invention, there is provided an apparatus for drying and concentrating, using waste vapor, which includes: a vapor supplying unit that produces and supplies vapor, using a boiler; a vapor storing unit that temporarily stores the vapor from the vapor supplying unit; a drying/concentrating unit that receives the vapor from the vapor storing unit and dries/concentrates a high-moisture material with heat energy; a waste vapor collecting unit that collects waste vapor produced from the high-moisture material in the drying/concentrating unit; a vapor compressing unit that compresses the waste vapor collected by the waste vapor collecting unit; a condensate water discharging unit that separates condensate water, which is discharged after used as heat source in the drying/concentrating unit, and odious gases and discharges them; and odious gases supplying line through which the odious gases separated by the condensate water discharging unit is supplied to the boiler.

The waste vapor compressing unit may compress the waste vapor to a pressure of 5 to 10 bar (absolute pressure) and a temperature of 160 to 200° C.

The waste vapor compressing unit may be an impeller centrifugal or positive displacement screw compressor.

The waste vapor collecting unit may collect the waste vapor at a pressure of 1 to 2 bar (absolute pressure) and a temperature of 100 to 130° C.

The condensate water discharging unit may expand the condensate water at a pressure of 1 bar or less.

The stink gas discharging line may include an induced draft fan that sends the separated odious gases to the boiler.

BRIEF DESCRIPTION OF THE DRAWINGS

FIG. 1 is a block diagram illustrating the configuration of an apparatus for drying and condensing which uses waste vapor according to an embodiment of the present invention.

[Description of Main Reference Numerals of Drawings]

| | | | |
|---|---|---|---|
| 100: | Apparatus for drying and concentrating | | |
| 110: | Vapor supplying unit | 120: | Vapor storing unit |
| 130: | Drying/concentrating unit | 140: | Waste vapor collecting unit |
| 150: | Waste vapor compressing unit | 160: | Condensate water discharging unit |
| 170: | Odious gases discharging line | | |

DETAILED DESCRIPTION OF THE PREFERRED EMBODIMENT

According to the present invention, waste vapor produced from a high-moisture material in drying/concentrating can be collected, compressed, and then reused as a heat source in an indirect heat transfer type in the drying/concentrating, vapor discharged after used as a heat source in the drying/concentrating can be separated into condensate water and odious gases, and the odious gases can be supplied to the boiler that is used for producing vapor and then removed by burning with fuel.

Hereinafter, exemplary embodiments of the present invention will be described with reference to accompanying drawings.

FIG. 1 is a block diagram illustrating the configuration of an apparatus for drying and condensing which uses waste vapor according to an embodiment of the present invention.

Referring to FIG. 1, an apparatus 100 for drying and condensing which uses waste vapor according to an embodiment of the present invention includes a vapor supplying unit 110, a vapor storing unit 120, a dry/condensing unit 130, a waste vapor collecting unit 140, a waste vapor compressing unit 150, a condensate water discharging unit 160, and odious gases discharging line 170.

The present invention is described with reference to FIG. 1.

The vapor supplying unit 110 produces and supplies vapor for operating a boiler that burns a gas or oil. The vapor supplying unit 110 can produce and supply high-temperature and high-pressure vapor for the parts requiring vapor.

The vapor supplying unit 110 using a boiler is well known in the art, so the detailed description is not provided. Accordingly, the boiler of the vapor supplying unit 110 is not illustrated in the FIGURE.

The vapor storing unit 120 temporarily stores the vapor from the vapor supplying unit 110. The vapor storing unit 120 stores vapor and uniformly supplies it to the drying/concentrating unit 130.

Further, the vapor storing unit 120 can store waste vapor compressed through the waste vapor compressing unit 150 to be described below and then supply it to the drying/concentrating unit 130.

The drying/concentrating unit 130 receives high-temperature and high-pressure vapor and performs predetermined drying and concentrating, using its heat in an indirect heat transfer type. The used vapor is discharged in a liquid state at a low temperature with the heat sufficiently taken and the odious gases are separated and burned by the boiler. The drying and concentrating, which is a part of the processes in various fields such as processing of food, producing of medicines, and manufacturing of semiconductors, includes all of drying and concentrating that removes moisture from a high-moisture material, using heat of high-temperature and high-pressure vapor in an indirect heat transfer type, and in this process, low-temperature and low-pressure vapor and a stink gas are discharged.

The object to be processed by the drying/concentrating unit 130 may be a material with a water content ratio of 30% or more and the water content ratio may be changed to various levels by the user, if necessary.

In the drying/concentrating unit 130, the waste vapor produced from a high-moisture material in drying/concentrating may be collected by the waste vapor collecting unit 140 to be described below.

The waste vapor collecting unit 140 is disposed at a side from the drying/concentrating unit 130 and collects the waste vapor produced from a high-moisture material in drying/concentrating. In the drying/concentrating, gases (including odious gases, air, and hydrocarbon, and the like.) other than the waste vapor may be produced and the waste vapor collecting unit can those other gases.

The waster vapor collecting unit 140 adjusts the collected waster vapor at an absolute pressure of 1 to 2 bar and a temperature of 100 to 130 degrees. When drying/concentrating is performed with the inside of the apparatus, where waster vapor is produced, under substantially vacuum lower than the atmospheric pressure, the pressure of the discharged vapor is 1 bar (absolute pressure) or less and the temperature is 100° C. or less. When the vapor in this state is directly supplied to a centrifugal or positive displacement screw compressor in the waste vapor compressing unit 150 to be described below, the performance of the positive displacement screw compressor may be decreased or inflow may be impossible. Accordingly, the waster vapor collecting unit 140 adjusts the collected waster vapor at a pressure of 1 to 2 bar and a temperature of 100 to 130° C. and supplies it to the waste vapor compressing unit.

The waste vapor compressing unit 150 compresses the waste vapor collected by the waste vapor collecting unit 140 at a predetermined pressure and supplies it to the vapor storing unit 120.

The waste vapor compressing unit 150 compresses the collected waste vapor at a pressure of 5 to 10 bar and a temperature of 160 to 200° C., which is the state of vapor used in the drying/concentrating unit, and supplies it to the vapor storing unit.

The latent heat of the waste vapor compressed by the waste vapor compressor 150 can be reused in the drying/concentrating unit 130.

The waste vapor compressing unit 150 may be a centrifugal or positive displacement screw compressor that is driven by a motor. The centrifugal or positive displacement screw compressor cools vapor by directly spraying cooling water to the vapor from the outside in order to keep the temperature of the vapor appropriate in compressing, such that the amount of vapor at the outlet may increase by a predetermined amount more than that at the inlet. It is preferable that the RPM of the impeller of the centrifugal vapor compressor is over 30,000 RPM.

Since the centrifugal or positive displacement screw compressor of the waste vapor compressing unit 150 has a strong intake force, it can be easily used even if the pressure of the waste vapor flowing into the inlet is low, in which the pressure at the outlet is higher than that of common boilers.

[Table 1] Table 1 illustrates the state of vapor compressed by the waste vapor compressing unit, the used power, and the efficiency.

TABLE 1

| Item | Properties of waste vapor at inlet of vapor compressing unit | | | Properties of waste vapor at outlet of vapor compressing unit | | | Total power for operating vapor compressing unit (a) (kw) | Power consumption of motor/amount of heat of fuel for boiler (%) |
|---|---|---|---|---|---|---|---|---|
| | Input amount of vapor (ton/hr) | Absolute pressure of vapor (bar) | Temperature of vapor (° C.) | Discharge amount of vapor (ton/hr) | Absolute pressure of vapor (bar) | Temperature of vapor (° C.) | | |
| Screw compressor | 1.032 | 0.8 | 100 | 1.291 | 8 | 170 | 178 | 18.2 |

TABLE 1-continued

| | Properties of waste vapor at inlet of vapor compressing unit | | | Properties of waste vapor at outlet of vapor compressing unit | | | Total power for | Power consumption |
|---|---|---|---|---|---|---|---|---|
| Item | Input amount of vapor (ton/hr) | Absolute pressure of vapor (bar) | Temperature of vapor (° C.) | Discharge amount of vapor (ton/hr) | Absolute pressure of vapor (bar) | Temperature of vapor (° C.) | operating vapor compressing unit (a) (kw) | of motor/ amount of heat of fuel for boiler (%) |
| Centrifugal compressor | 1.0 | 1.1 | 110 | 1.1 | 6 | 165 | 130 | 15.6 |

The energy efficiency of the waste vapor compressing unit can be converted as follows.

$$\frac{a \times 860(\text{kcal/kW} \cdot \text{hr})}{650(\text{kcal/kg}) \times b} \quad \text{[Formula 1]}$$

where a is total power consumption for operating vapor compressing unit and b is the discharge amount of vapor.

It can be seen from [Formula 1] that when the screw compressor of this embodiment is used, the energy efficiency is 18.2%, and when the centrifugal compressor is used, the energy efficiency is 15.6%.

The vapor compressed by the waste vapor compressing unit 150 is supplied to the drying/concentrating unit 130 through the vapor storing unit 120 and it can be reused. Since the drying/concentrating unit of this embodiment reuses waste vapor produced from a high-moisture material by compressing it, the amount of energy consumed by the entire apparatus can be reduced.

The vapor supplied to the drying/concentrating unit 130 from the vapor storing unit 120 is used as a heat source in the drying/concentrating unit, some of the vapor is disposed as condensate water with the latent heat fully removed, and the other is disposed in the types of various gases with a stink. The discharged condensate water and stink gases are sent to the condensate water discharging unit 160.

The condensate water discharging unit 160 separates the condensate water and the stink gases, and then discharges the separated condensate water to the outside and burns the stink gases in a boiler.

The condensate water discharging unit 160, of which the inside is under low pressure about 1 bar, expands due to the low internal pressure when the condensate water and the stink gases discharged from the drying/concentrating unit 130 flows therein.

In the condensate water discharging unit 160, the change in density of the condensate water due to the expansion is small, but the density of the stink gases decreased to ⅕ or less and they are separated from the condensate water.

The condensate water may be processed by an external processing unit. Further, the separated stink gases are burned by the boiler of the vapor supplying unit 110 and discharged through the stink gas discharging line 170.

According to the present invention, since waste vapor produced from a high-moisture material in drying/concentrating is collected, compressed, and then reused as a heat source in the drying/concentrating, thereby increasing the energy efficiency, it is possible to reduce fuel consumption by 50% or more in comparison to installation that dry/concentrate a high-moisture material, using only a boiler in the related art.

Further, according to the present invention, it is possible to efficiently burn and remove odious gases produced from vapor that has been used as a heat source in drying/concentrating, by separating the odious gases from condensate water and supplying it to a boiler that is used for producing vapor.

Although the present invention has been described with reference to the embodiments illustrated in the drawings, those are only examples and may be changed and modified into other equivalent embodiments from the present invention by those skilled in the art. Therefore, the technical protective region of the present invention should be determined by the scope described in claims.

The invention claimed is:

1. An apparatus for drying and concentrating, using waste vapor, the apparatus comprising:
   a vapor supplying unit configured to produce and supply vapor by using a boiler;
   a vapor storing unit configured temporarily to store the vapor from the vapor supplying unit;
   a drying/concentrating unit configured to receive the vapor from the vapor storing unit, and to dry/concentrate a high-moisture material using the heat energy of the vapor in an indirect heat transfer type;
   a waste vapor collecting unit configured to collect waste vapor produced from the high-moisture material in the drying/concentrating unit;
   a waste vapor compressor configured to compress the waste vapor collected by the waste vapor collecting unit;
   a condensate water discharging unit configured to collect condensate water including stink gases discharged from the drying/concentrating unit, to separate the stink gases from the condensate water by expanding the stink gases, to discharge the condensate water separated from the stink gases to outside, and to discharge the stink gases separated from the condensate water to a stink gas discharging line which supplies the stink gases to the boiler, wherein
   a pressure of the inside of the condensate water discharging unit is under low pressure about 1 bar such that the condensate water is not expanded in the condensate water discharging unit, whereas the stink gases are expanded as density of the stink gases decreases to ⅕ or less in the condensate water discharging unit.

2. The apparatus of claim 1, wherein the waste vapor compressor compresses the waste vapor to a pressure of 5 to 10 bar (absolute pressure) and a temperature of 160 to 200° C.

3. The apparatus of claim 1, the waste vapor compressor is an impeller centrifugal or positive displacement screw compressor.

4. The apparatus of claim 3, wherein the waste vapor collecting unit collects the waste vapor at a pressure of 1 to 2 bar (absolute pressure) and a temperature of 100 to 130° C.

5. The apparatus of claim 1, wherein the stink gas discharging line includes an induced draft fan that sends the separated stink gases to the boiler.

6. The apparatus of claim 2, the waste vapor compressor is an impeller centrifugal or positive displacement screw compressor.

\* \* \* \* \*